UNITED STATES PATENT OFFICE.

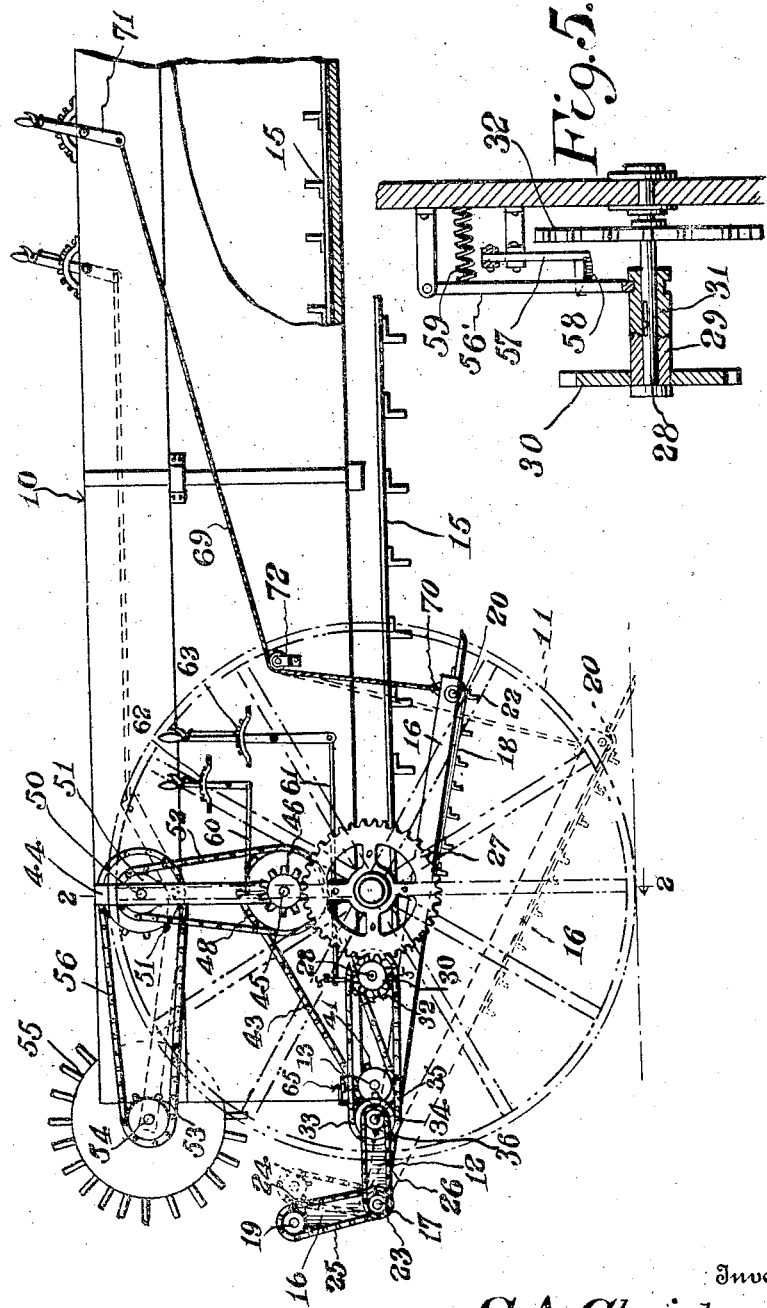

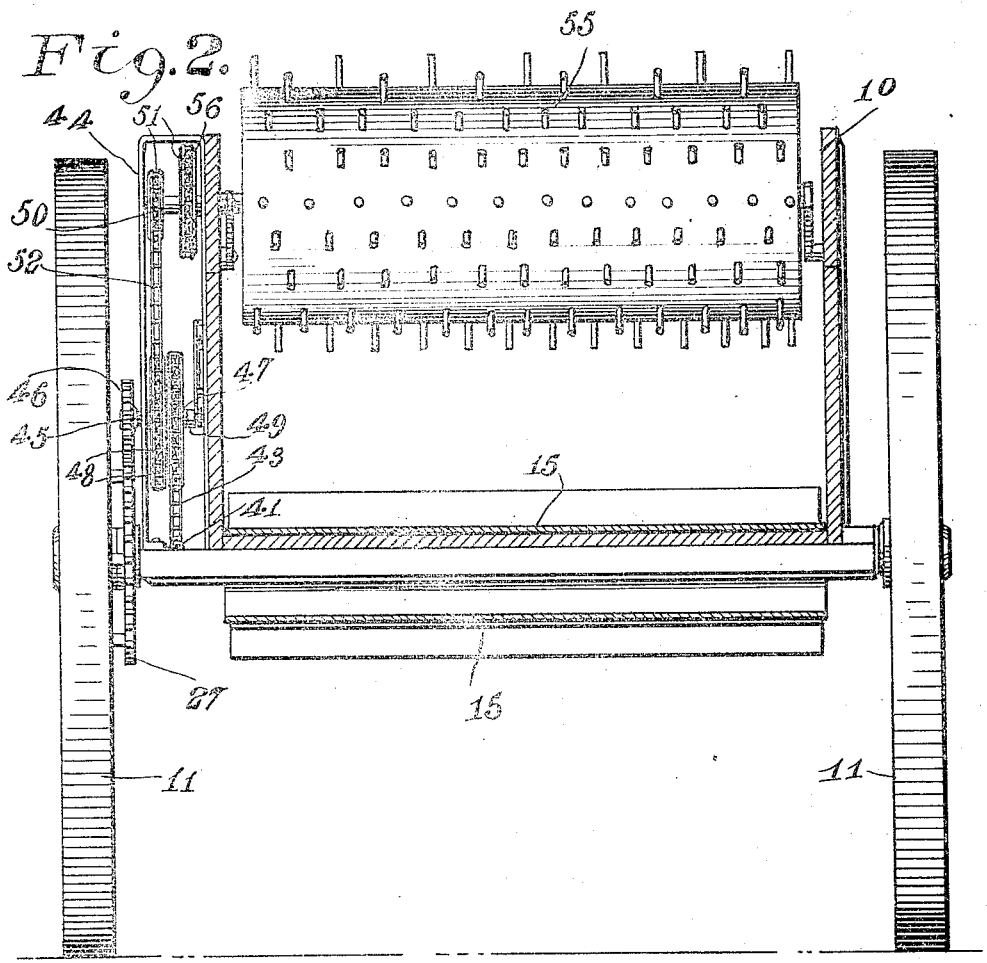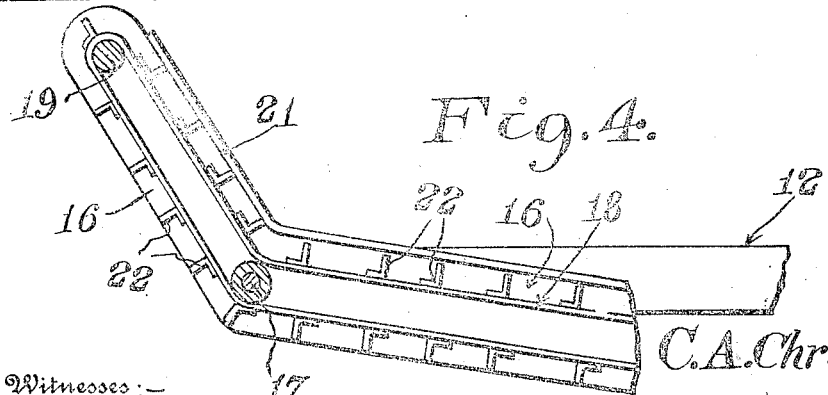

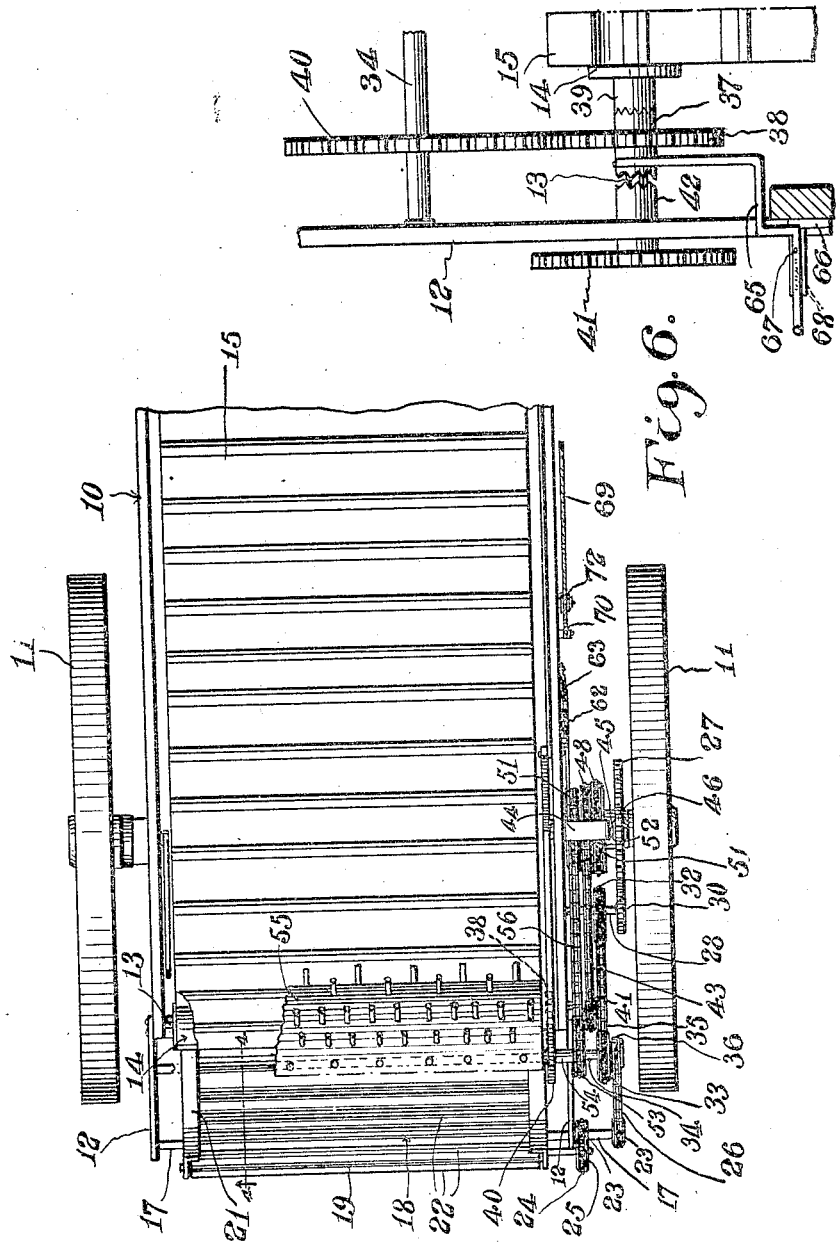

CLAUS A. CHRISTENSON, OF MAPLE PARK, ILLINOIS.

MANURE-SPREADER.

1,050,423.   Specification of Letters Patent.   Patented Jan. 14, 1913.

Application filed January 8, 1912. Serial No. 670,017.

*To all whom it may concern:*

Be it known that I, CLAUS A. CHRISTENSON, a citizen of the United States, residing at Maple Park, in the county of Kane, State of Illinois, have invented certain new and useful Improvements in Manure-Spreaders; and I do hereby declare the following to be a full, clear, and exact description of the invention, such as will enable others skilled in the art to which it appertains to make and use the same.

This invention relates to manure spreaders and has for an object to provide a device of this character which will have a novel elevator for loading the device, the elevator being pivotally secured to the vehicle box so as to be swung up underneath the box when not in use.

A second object of the invention is to provide a device of this character having novel mechanisms for actuating the elevator and the horizontal endless carrier on the vehicle bottom to facilitate a quick loading of the device, novel means being also provided for reversing the direction of the horizontal endless carrier when unloading.

A third object of the invention is to provide novel mechanisms for simultaneously actuating the horizontal endless carrier and the spreader cylinder when unloading, there being furthermore novel means for holding the spreader cylinder quiescent during the loading operation.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of the rear end portions of a farm wagon equipped with my improved loading and spreading means. Fig. 2 is a cross sectional view taken on the line 2—2 Fig. 1. Fig. 3 is a plan view of the device with portions of the spreader cylinder removed. Fig. 4 is an enlarged fragmentary sectional view taken on the line 4—4 Fig. 3. Fig. 5 is an enlarged cross sectional view taken on the line 5—5 Fig. 1. Fig. 6 is a fragmentary sectional view showing the clutch mechanism for reversing the horizontal endless carrier.

Referring now to the drawings in which like characters of reference designate similar parts, 10 designates a farm wagon box and 11 the ground wheels thereof, only the rear portion of the box being shown for the sake of clearness. Extending rearwardly from the box are spaced arms 12 having suitable orifices for the reception of a shaft 13 which carries a roller 14 over which and a similar roller near the forward end of the box, (not shown) an endless fabric carrier 15 is trained, the upper side of the carrier being disposed above the floor of the box, and the lower side below the floor of the box as shown in Fig. 1. The endless carrier may be actuated in either of two directions to facilitate loading or unloading as will presently be described.

An elevator is attached pivotally to the outer ends of the arms 12, the elevator comprising spaced sides 16 approximately L-shaped in outline, and being provided at the elbows with suitable orifices through which a shaft 17 is loosely engaged, this shaft being journaled at the outer ends of the arms and forming a pivot on which the elevator may be rocked into operative position as shown by dotted lines in Fig. 1 or into released position as shown by full lines in said figure. An endless fabric carrier 18 is trained over rollers 19 and 20 disposed near the upper and lower ends of the sides respectively, the endless carrier being made to conform to the outline of the sides through the instrumentality of guide strips 21 which project inwardly from the upper edges of the sides and bear upon the flights 22 of the endless carrier. One end of the shaft 17 projects outwardly beyond the side and is equipped with spaced sprocket gears 23 over one of which and a similar gear 24 carried by the upper roller 19 is trained a sprocket chain 25, and over the other of which a sprocket chain 26 is trained, the last named chain being connected to the driving mechanism as will presently be described.

Fixed to the hub of the ground wheel 11 is a gear 27 and projecting from the side of the box is a stub shaft 28 on which is loosely mounted a sleeve 29 carrying a fixed gear 30 which meshes with the gear 27. For locking the sleeve and shaft together for simultaneous rotation, a clutch sleeve 31 is slidably mounted upon the shaft and is equipped with the usual ratchet face which meshes with a similar ratchet face formed on the sleeve 29. When the clutch sleeve is slid into operative engagement with the gear sleeve 29 the gear will rotate the stub shaft 28 and when the clutch sleeve is thrown out of operative engagement with the gear sleeve, the gear idles on the shaft.

Fixed to the stub shaft is a sprocket gear 32. Over the sprocket gear 32 and a sprocket gear 33 carried by a shaft 34 which is journaled in the arms 12, a sprocket chain 35 is trained, and fixed to the shaft 34 is a second sprocket gear 36 over which the above mentioned sprocket chain 26 is trained. During forward rotation of the vehicle wheel 11, the endless carrier of the elevator will be actuated by the above described train of gearing, the upper side of the endless carrier traveling upwardly whereby the material scooped up by the lower end of the elevator is raised to the floor of the wagon box and here the endless carrier 15 of the wagon box will take up the load and carry it forwardly in the box, suitable mechanism being employed for actuating the endless carrier 15 in this direction as will now be described.

Slidably fitted to the rear roller shaft 13 of the endless carrier 15, is a clutch sleeve 37 having clutch faces at the opposite ends and furthermore being equipped with a gear 38. When slid inwardly upon the roller shaft 13, the clutch face at one end of the sleeve interfits with a similar clutch face 39 formed on the roller 14, and in this position of the parts, the gear 38 meshes with a gear 40 carried upon the above mentioned shaft 34. Upon rotation of the shaft 34 the roller 14 is rotated in a forward direction and advances the upper side of the endless carrier forwardly in the wagon box. For reversing the direction of rotation of the roller whereby to advance the upper side of the endless carrier rearwardly during the unloading operation, a loose gear 41 is mounted on the shaft 13 and is equipped on its hub with a ratchet face 42 which meshes with the opposing ratchet face on the clutch sleeve 37 when the latter is moved outwardly on the shaft 13, the sleeve thus locking the shaft and gear 41 together for simultaneous rotation.

A sprocket chain 43 is trained over the gear 41 and as will be presently described is actuated in such a direction as to rotate the shaft 13 in a rearward direction and thus advance the upper side of the endless carrier 15 rearwardly in the box.

An inverted U-shaped bracket 44 is secured in vertical position to the outer face of the box and journaled in the legs of the bracket is a stub shaft 45 which is equipped with a gear 46 that meshes with the gear 27. A loose sleeve 47 is mounted on the stub shaft and is equipped with spaced gears 48 over one of which the above mentioned chain 43 is trained. A clutch sleeve 49 is slidably fitted to the stub shaft and is provided with a clutch face to operatively engage a similar clutch face on the sleeve 47 whereby to lock the latter to the stub shaft, and when the parts are so locked, the chain 43 is actuated so as to actuate the endless carrier 15 in a rearward direction for unloading. A stub shaft 50 is journaled in the bracket and is equipped with spaced gears 51 over one of which and one of the gears 48 a sprocket chain 52 is trained. Over the other of the gears 51 and a gear 53 carried upon the shaft 54 of a spiked spreader cylinder 55, a sprocket chain 56 is trained. When the clutch sleeve 49 is thrown into active position, both the spreader cylinder and the endless carrier 15 are simultaneously actuated in a rearward direction, it being understood that during this movement of the parts, the clutch sleeve 31 will be held in inactive position and the clutch sleeve 37 in engagement with 41.

When it is desired to load the device, the clutch sleeve 49 is moved to inactive position and the clutch sleeve 31 moved into active position and the clutch sleeve 37 moved to engage 39, and when the parts are so disposed the spreader cylinder actuating mechanism together with the mechanism which actuates the endless carrier 15 in a rearward direction, will be quiescent.

The shifting mechanism for the clutch sleeves 49 and 31 are identical and each consists of a yoke 56' which fits in a groove formed in the clutch sleeve, and is pivotally connected to one side of the wagon box. A rock link 57 is pivotally connected to the side of the box and is provided with an outturned cam finger 58 having an inclined edge adapted to ride upon the yoke and force the latter outwardly, a helical spring 59 returning the yoke to normal position. Connecting links 60 and 61 connect the rock links to operating levers 62 and 63 by means of which the clutch sleeves may be manipulated.

For manipulating the clutch sleeve 37, a yoke 64 is loosely fitted in a groove in the clutch sleeve, and is provided with an outwardly extending grip 65, this grip bearing upon an angle iron bracket 66 carrying a pin 67 which may be selectively engaged in any one of a series of openings 68 formed in the grip whereby to lock the grip and maintain the cam sleeve slid to its limit of movement in either direction, whereby to actuate the endless carrier 15 forwardly or rearwardly as above described.

For rocking the elevator on its pivot a cable or similar connector 69 is connected at one end to the lower end of the elevator as shown at 70 and is connected at the opposite end to a hand lever 71, the intermediate portion of the cable being trained over a sheave 72 arranged on the outer side of a wagon box. The operating lever may be shifted so as to permit of the lower end of the elevator gravitating into operative position, or to lift the lower end of the elevator to inoperative position.

What is claimed, is:—

1. A loader including a wheeled box, an endless elevator of substantially L-shape pivoted at the elbow on the rear end of the box and having a scoop lower end extending underneath the box, an endless carrier on the bottom of said box, and means for simultaneously actuating said elevator and said endless carrier.

2. A loader including a wheeled box, an L-shaped endless elevator pivoted at the elbow at the rear end of said box and having a scoop lower end, means for rocking said elevator into operative and released position, an endless carrier on the bottom of said box, means for selectively actuating said endless carrier in a forward or a rearward direction, means for actuating said elevator in an upward direction during actuation of said endless carrier in a forward direction, and means for holding said elevator quiescent during actuation of said endless carrier in the rearward direction.

3. A loader including a wheeled box, an endless elevator at the rear end of said box having a scoop lower end, a spreader cylinder revolubly mounted on said box, an endless carrier in said box, means for simultaneously actuating said elevator and said endless carrier whereby to load said box, means for simultaneously actuating said endless carrier and said spreader cylinder whereby to unload said box, and means for holding said elevator quiescent during unloading of said box.

In testimony whereof, I affix my signature, in presence of two witnesses.

CLAUS A. CHRISTENSON.

Witnesses:
B. G. RICHMOND,
H. W. CLINE.